(12) United States Patent
Petter (10) Patent No.: US 8,664,787 B2
(45) Date of Patent: Mar. 4, 2014

(54) SPEED SETTING SYSTEM AND METHOD FOR A STALL-CONTROLLED WIND TURBINE

(75) Inventor: Jeffrey K. Petter, Williston, VT (US)

(73) Assignee: Northern Power Systems, Inc., Barre, VT (US)

( * ) Notice: Subject to any disclaimer, the term of this patent is extended or adjusted under 35 U.S.C. 154(b) by 831 days.

(21) Appl. No.: 12/754,253

(22) Filed: Apr. 5, 2010

(65) Prior Publication Data

US 2011/0241343 A1    Oct. 6, 2011

(51) Int. Cl.
*F03D 9/00* (2006.01)
*H02P 9/04* (2006.01)

(52) U.S. Cl.
USPC ......................................................... 290/44

(58) Field of Classification Search
USPC .................... 290/44, 55; 700/287, 290, 37
See application file for complete search history.

(56) References Cited

U.S. PATENT DOCUMENTS

| | | | |
|---|---|---|---|
| 4,427,897 A | | 1/1984 | Migliori |
| 4,584,486 A * | | 4/1986 | Quynn ............................ 290/44 |
| 4,695,736 A * | | 9/1987 | Doman et al. .................. 290/44 |
| 4,700,081 A * | | 10/1987 | Kos et al. ........................ 290/44 |
| 4,703,189 A * | | 10/1987 | DiValentin et al. ............. 290/44 |
| 5,652,485 A | | 7/1997 | Spiegel et al. |
| 5,796,240 A * | | 8/1998 | Saito et al. ...................... 322/10 |
| 6,703,718 B2 | | 3/2004 | Calley et al. |
| 6,840,734 B2 | | 1/2005 | Hansen |
| 6,984,897 B2 * | | 1/2006 | Skeist et al. .................... 290/44 |
| 7,015,595 B2 * | | 3/2006 | Feddersen et al. ............. 290/44 |
| 7,095,128 B2 | | 8/2006 | Canini et al. |
| 7,191,589 B2 | | 3/2007 | Yasui et al. |
| 7,420,288 B2 | | 9/2008 | Calley |
| 7,420,289 B2 * | | 9/2008 | Wang et al. ..................... 290/44 |
| 2004/0119292 A1 | | 6/2004 | Datta et al. |
| 2008/0296897 A1 | | 12/2008 | Kovach et al. |
| 2008/0307853 A1 | | 12/2008 | Siebers et al. |
| 2011/0089694 A1* | | 4/2011 | Arinaga et al. ................ 290/44 |

FOREIGN PATENT DOCUMENTS

| | | |
|---|---|---|
| EP | 1988284 A1 | 11/2008 |
| JP | 2009-068379 A | 4/2009 |

OTHER PUBLICATIONS

International Search Report and Written Opinion dated Oct. 20, 2011, in connection with related PCT/US2011/031041 filed Apr. 4, 2011.

E. Muljadi and C.P. Butterfield; Pitch-Controlled Variable-Speed Wind Turbine Generation; Feb. 2000; IEEE Industry Applications; NREL/CP-500-27143; pp. 1-8.

T.A. Lipo and P. Tenca; Design and Test of a Variable Speed Wind Turbine System Employing a Direct Drive Axial Flux Synchronous Generator; Jul. 2006; National Renewable Energy Laboratory; Subcontract Report NREL/SR-500-39715; pp. 1-50.

* cited by examiner

*Primary Examiner* — Julio C. Gonzalez (74) *Attorney, Agent, or Firm* — Downs Rachlin Martin PLLC (57) ABSTRACT

A speed setting system that generates a speed control command for controlling the rotational speed of a stall-controlled wind turbine of a wind-powered machine. The speed setting system generates the speed command as a function of performance variation of the wind turbine due to environmental and/or other factors. The speed setting system utilizes a performance-compensation term that is slowly adjusted to compensate for relatively long-term performance variation. In one example, the performance-compensation term is adjusted only when the current power output of the wind turbine is at least 80% of the rated output power to ensure the wind speed is sufficiently high.

9 Claims, 6 Drawing Sheets

SPEED SETTING SYSTEM AND METHOD FOR A STALL-CONTROLLED WIND TURBINE

FIELD OF THE INVENTION

The present invention generally relates to the field of wind turbines. In particular, the present invention is directed to a speed setting system and method for a stall-controlled wind turbine.

BACKGROUND

Stall control is often used in small wind power units (WPUs) as an alternative to more complex pitch control. Stall control is also being considered for very large WPUs of the future because pitch control can be complex and expensive in very large turbines. In stall control, the speed of the wind turbine is limited to a speed at which the power output is limited by the aerodynamics of the blades regardless of how much wind power is available. A challenge in designing stall control systems is accurately limiting the shaft power of the wind turbine because the power limit is a function of the air density, blade shape, blade pitch and wind turbine speed. In addition, blade soiling reduces performance over time. Generally, these factors cannot be controlled to a high degree of precision, so compromises need to be made.

When a wind turbine is operating in a stall-control regime, depending on the region on the speed-power curve in which the turbine is operating a small change in speed results in a large change in power. Consequently, choosing an optimal speed is difficult. In addition, the repeatability of blade performance and blade pitch is also difficult to maintain. On top of this, the air density at the site of the wind turbine varies with weather conditions and elevation of the turbine. So, for WPUs with fixed speed, the manufacturer or installer needs to change the blade length or pitch to manage the power from site to site and, possibly, from season to season, depending on the location of a particular installation. Generally, what is conventionally done is that a pitch setting is chosen so that the wind turbine provides the optimum power when the air is coldest. This results in the wind turbine providing less-than-optimum power when the weather is warmer. This pitch setting needs to be chosen conservatively so that the wind turbine does not provide too much power so as to overstress the WPU or cause and over-speed situation that would result in the WPU shutting down to protect itself from damage.

SUMMARY OF THE DISCLOSURE

In one implementation, the present disclosure is directed to a controller for controlling rotational speed of a stall-controlled wind turbine of a wind-powered machine having a speed control system for controlling the rotational speed. The controller includes: a speed setting system in operative communication with the speed control system and configured for: generating a speed command that commands the speed control system to control the rotational speed of the stall-controlled wind turbine, the speed command being a function of a performance-compensation term; and changing the performance-compensation term as a function of performance variation of the stall-controlled wind turbine.

In another implementation, the present disclosure is directed to a method of controlling rotational speed of a stall-controlled wind turbine of a wind-powered machine having a speed control system for controlling the rotational speed. The method includes: determining a performance-compensation term as a function of performance variation of the stall-controlled wind turbine; generating a speed command that commands the speed control system to control the rotational speed of the stall-controlled wind turbine, the speed command being a function of the performance-compensation term; and providing the speed command to the speed control system so as to control the rotational speed of the stall-controlled wind turbine.

In still another implementation, the present disclosure is directed to a machine-readable storage medium containing machine-executable instructions for implementing a method of controlling rotational speed of a stall-controlled wind turbine of a wind-powered machine having a speed control system for controlling the rotational speed. The machine-executable instructions include: a first set of machine-executable instructions for determining a performance-compensation term as a function of performance variation of the stall-controlled wind turbine; a second set of machine-executable instructions for generating a speed command that commands the speed control system to control the rotational speed of the stall-controlled wind turbine, the speed command being a function of the performance-compensation term; and a third set of machine-executable instructions for providing the speed command to the speed control system so as to control the rotational speed of the stall-controlled wind turbine.

In yet another implementation, the present disclosure is directed to a controller for controlling rotational speed of a stall-controlled wind turbine of a wind-powered machine having a speed control system for controlling the rotational speed, wherein the stall-controlled wind turbine has a power-coefficient curve having a deep-stall control portion. The controller includes: a speed setting system operatively configured to provide a speed control command to the speed control system, the speed setting system including: a power speed block that determines the speed control command based on a speed limit curve derived as a function of the shape of the deep-stall control portion of the power-coefficient curve.

In still yet another implementation, the present disclosure is directed to a method of controlling rotational speed of a stall-controlled wind turbine of a wind-powered machine having a speed control system for controlling the rotational speed, wherein the stall-controlled wind turbine has a power-coefficient curve having a deep-stall control portion. The method includes: receiving a power limit signal corresponding to an output power limit PL for the stall-controlled wind turbine; determining a speed limit command based on a speed limit curve that is a function of: 1) the output power limit PL and 2) the shape of the deep-stall control portion of the power-coefficient curve; and outputting the power speed limit command to the speed control system.

In a further implementation, the present disclosure is directed to a machine-readable storage medium containing machine-executable instructions for implementing a method of controlling rotational speed of a stall-controlled wind turbine of a wind-powered machine having a speed control system for controlling the rotational speed, wherein the stall-controlled wind turbine has a power-coefficient curve having a deep-stall control portion. The machine-executable instructions include: a first set of machine-executable instructions for receiving a power limit signal corresponding to an output power limit PL for the stall-controlled wind turbine; a second set of machine-executable instructions for determining a speed limit command based on a speed limit curve that is a function of: 1) the output power limit PL and 2) the shape of the deep-stall control portion of the power-coefficient curve;

and a third set of machine executable instructions for outputting the power speed limit command to the speed control system.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
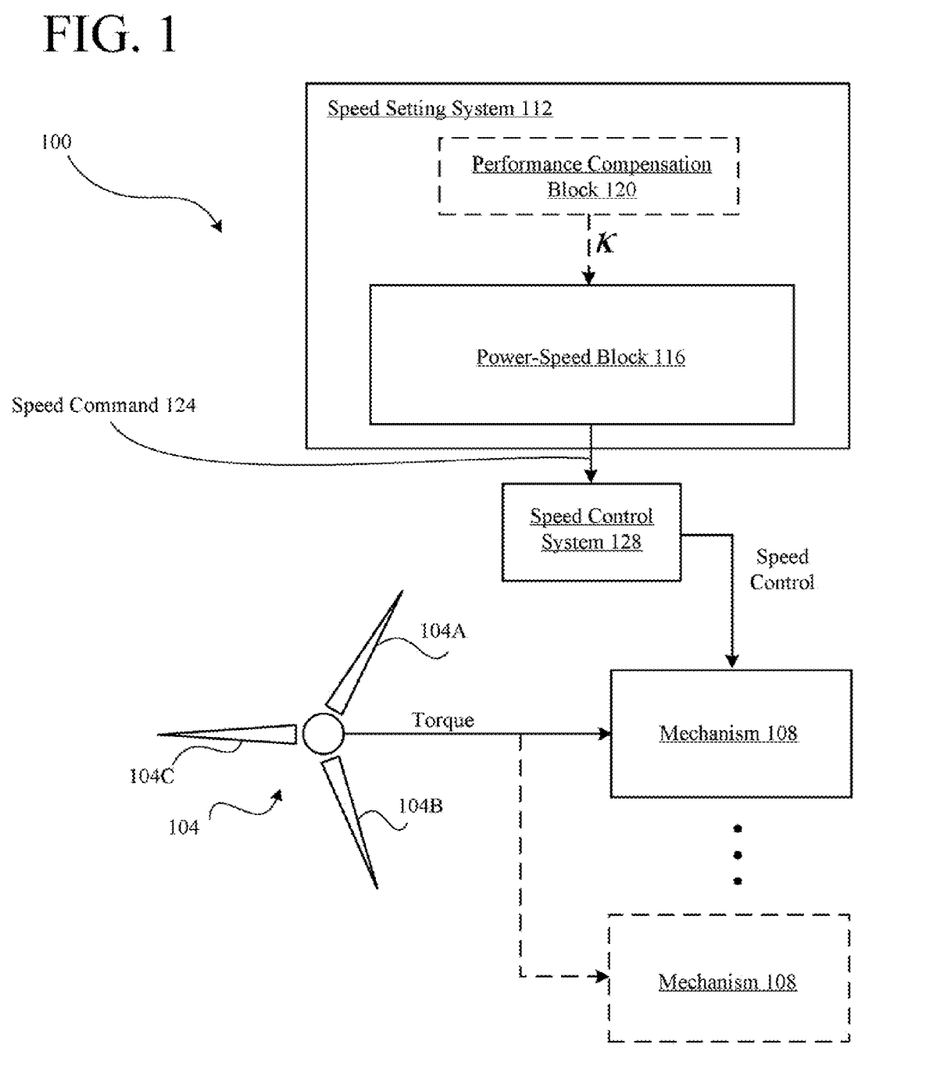
FIG. 1 is a high-level schematic diagram of a wind-powered machine that includes a speed setting system of the present disclosure.

Referring now to the drawings, FIG. 1 illustrates a wind-powered machine 100 having a stall-controlled wind turbine 104 that converts energy in wind into a torque that is used to power one or more mechanisms 108 that provide a useful output. Wind turbine 104 can be any suitable configuration, such as a horizontal axis configuration, a vertical axis configuration, a single-rotor configuration or a multi-rotor configuration and various combinations of these. Examples of mechanisms that can be deployed as the one or more mechanism 108 include electrical power generators (e.g., direct-drive and transmission-drive generators), pumps (e.g., water and other fluid pumps), thermal generators, braking systems, mixing machines and agitators, among many others. Indeed, the nature of the one or more mechanisms 108 does not limit broad application of the broad concepts disclosed herein across a variety of wind-powered machines.

Wind-powered machine 100 also includes a speed setting system 112 that is configured to compensate for machine and/or environmental variations in each installation to optimize the performance of the machine at all times. A goal of the operation of speed setting system 112 is to automatically adjust the operating speed of wind turbine 104 to these variations so that manual custom tuning of the design of wind-powered machine 100 is not needed from site to site, machine to machine and/or season to season to operate the machine safely and achieve optimal power.

Figure 3:
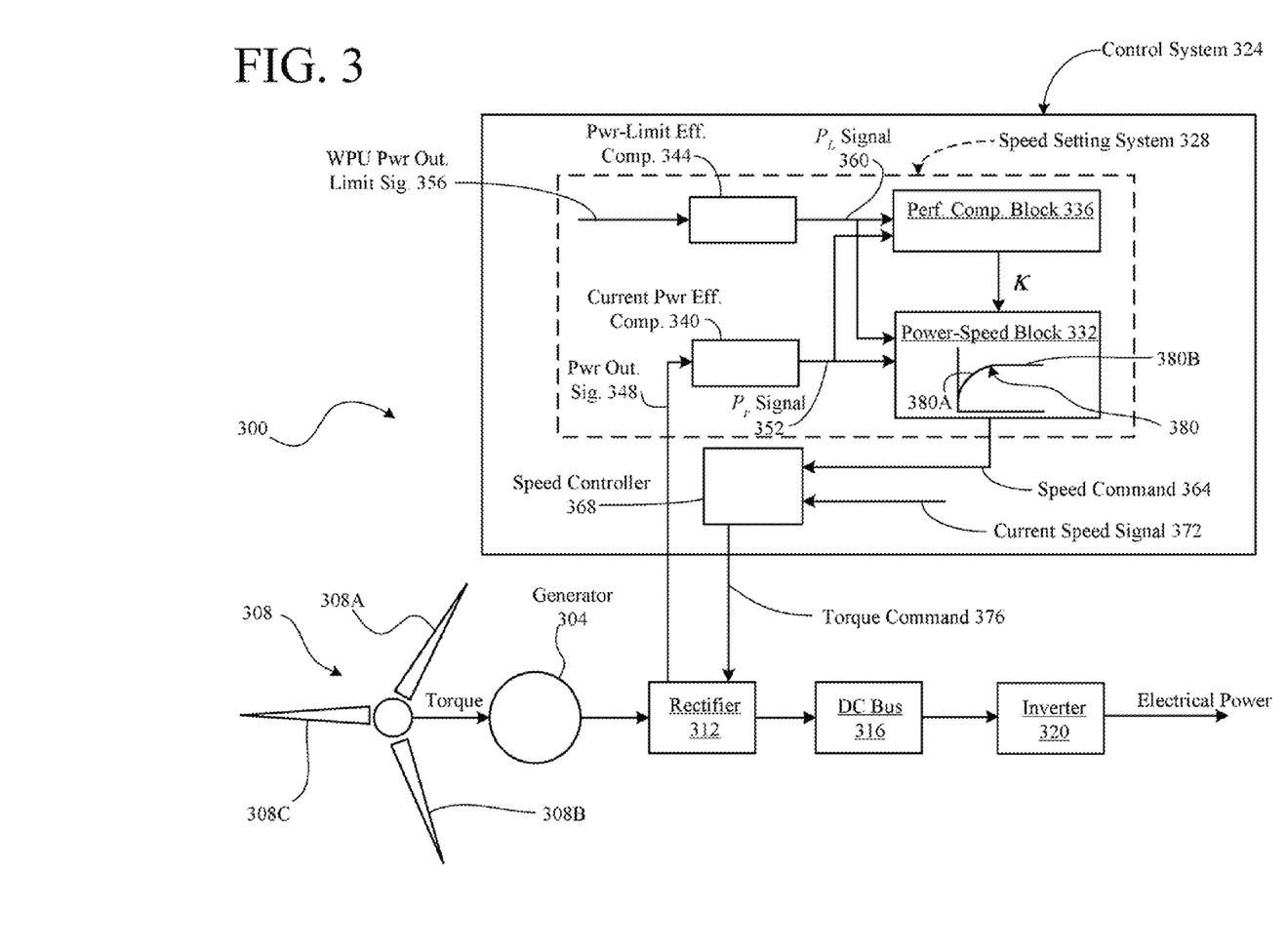
FIG. 3 is a high-level schematic diagram of a wind power unit (WPU) that implements a speed setting system of the present disclosure.
Figure 4:
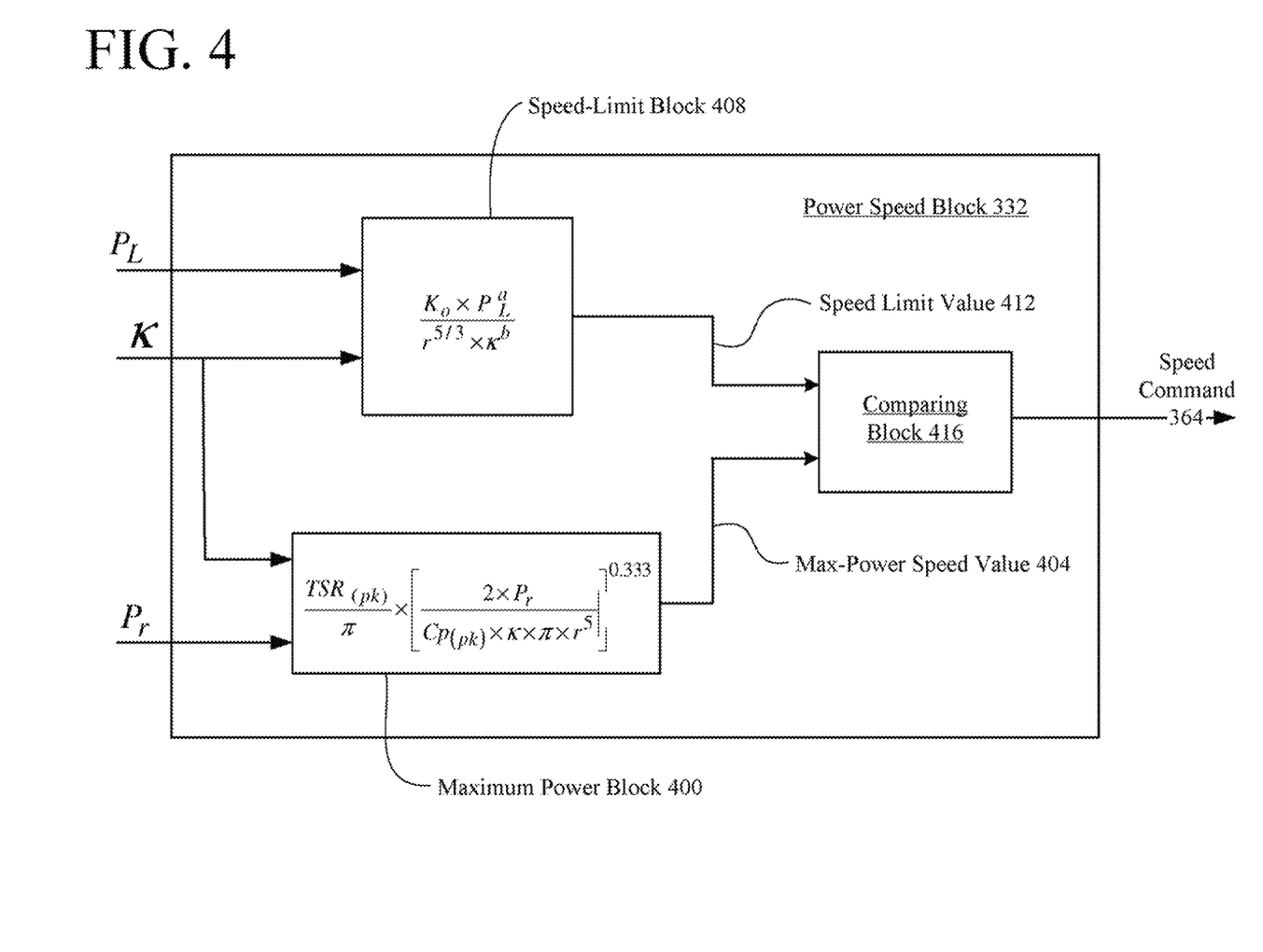
FIG. 4 is a block diagram illustrating an example of the power-speed block of the speed setting system of FIG. 3.
Figure 5:
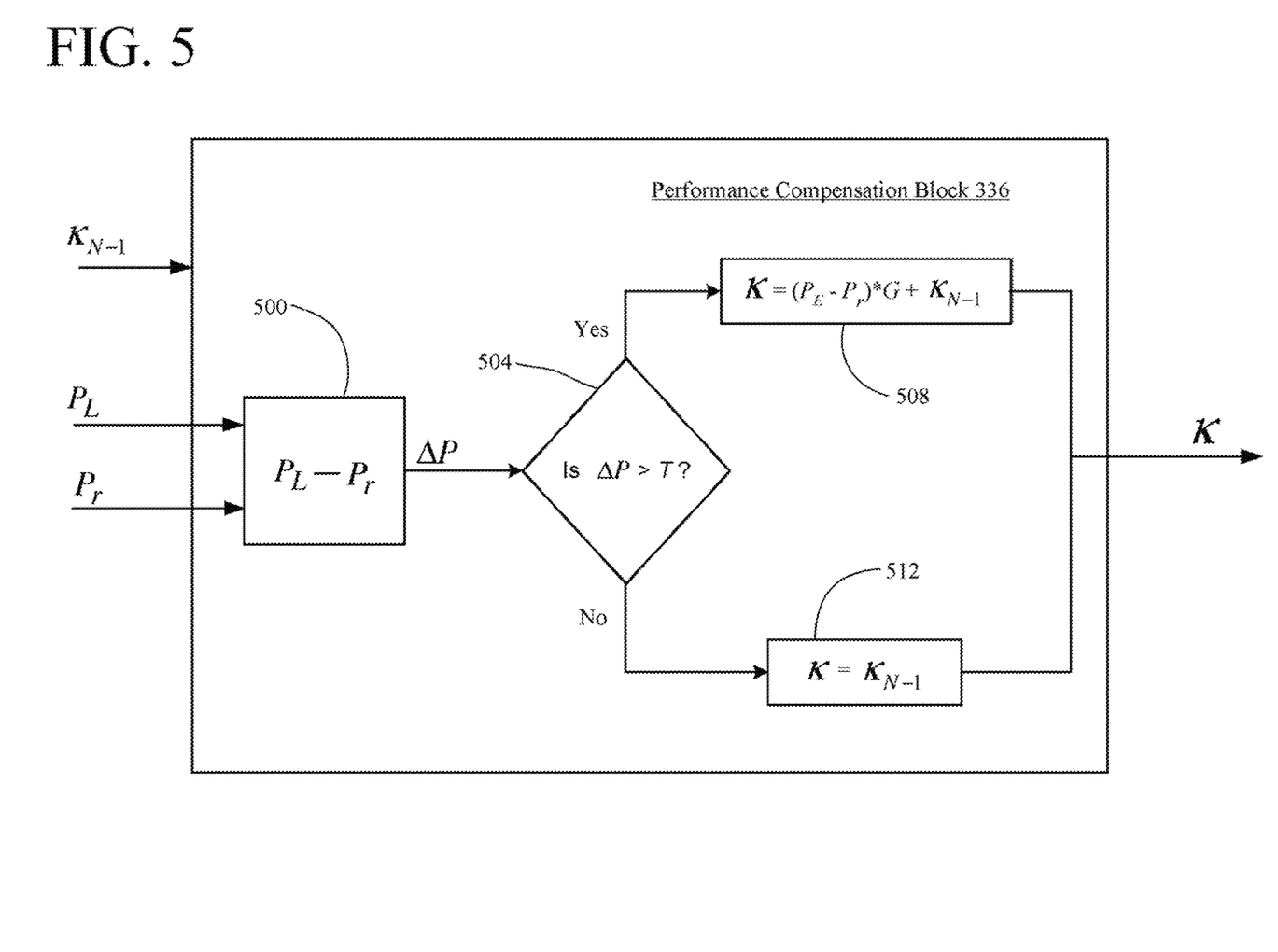
FIG. 5 is a block diagram illustrating an example of the performance-compensation block of the setting system of FIG. 3.

Speed setting system 112 utilizes a primary control functional block, namely, a power-speed block 116 and a performance-compensation block 120, to generate a speed command 124 that a speed control system 128 uses to control the speed of wind turbine 104. As will become apparent from reading this entire disclosure, speed control system 128 may be any suitable system for controlling the speed of wind turbine 104. For example, if mechanism 108 is a variable-speed electrical power generator, speed control system 128 can include a system for controlling torque within the generator by varying electrical current flowing through windings within the generator. Depending on the configuration of the generator and supporting electrical systems, such torque control can be achieved, for example, by controlling a rectifier or inverter on the output side of the generator. An example presented below in connection with FIGS. 3-5 illustrates a rectifier-based torque control scheme in detail. Because the one or more mechanisms 108 can be any of a wide range of mechanisms, it is not practical, nor necessary, to recite a list of speed control system types that can be used for speed control system 128, especially since the type of system depends greatly on the type(s) of the mechanism(s) 108.

Figure 2A:
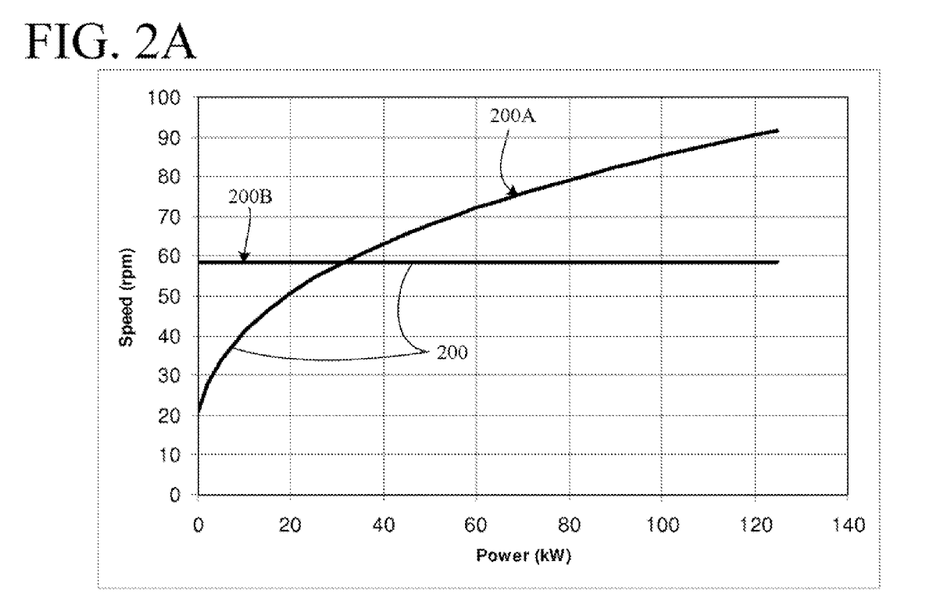
FIG. 2A is a graph of speed versus power for an exemplary wind turbine.

At a high level, power-speed block 116 implements or models a power-speed control curve that generally keeps wind turbine 104 operating at the optimum rotational speed for any power level. An example of a power-speed control curve that can be implemented in power-speed block 116 is power-speed control curve 200 shown in FIG. 2A, which is an example from a 100 kW stall-controlled wind power unit (WPU). Performance-compensation block 120 adjusts a performance-compensation term, κ, which power-speed block 116 uses to fine-tune the power-speed control curve, such as power-speed control curve 200 of FIG. 2A, used to control the speed of wind turbine 104.

Figure 2B:
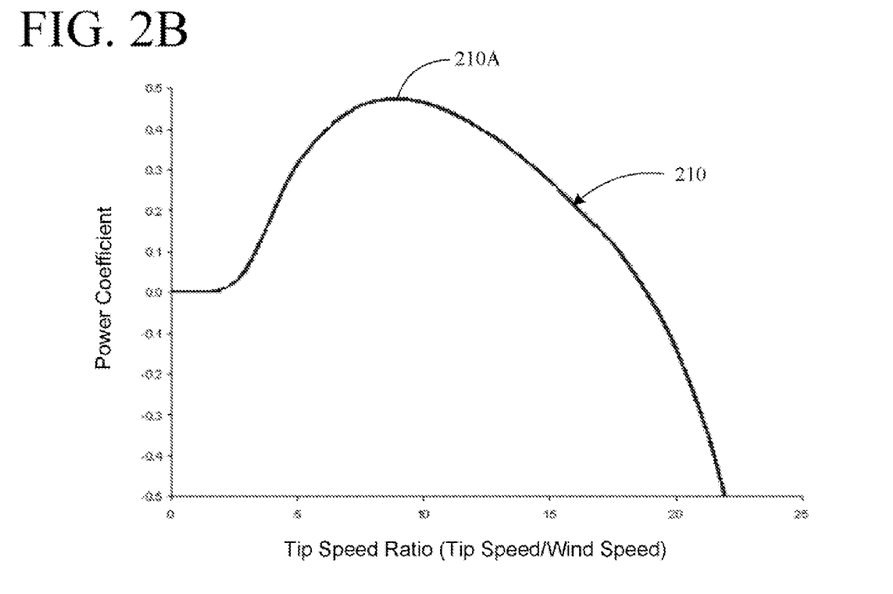
FIG. 2B is a power coefficient versus tip-speed-ratio curve for an exemplary wind turbine.

FIG. 2B illustrates a typical power coefficient ($C_p$) curve 210 for a wind turbine designed for use in a stall-controlled wind-powered machine, such as wind turbine 104 of wind-powered machine 100 of FIG. 1. As those skilled in the art know, in the context of wind-powered machine 100 of FIG. 1, the power coefficient is the ratio of the power generated by wind turbine 104 to the power in the wind passing the turbine. Power coefficient curve 210 illustrates the power coefficient as a function of tip speed ratio (TSR), which is the tip speed of the blades 104A-C of wind turbine 104 divided by the wind speed. As the wind speed increases relative to the blade speed, the operating point on power coefficient curve 210 moves to the left, i.e., more into the stall region. This is what happens in a wind turbine operating at constant speed as the wind speed increases. Since the power in the wind increases with the cube of the wind speed, power coefficient curve 210 needs to fall off faster than this to limit power.

Referring back to FIGS. 1 and 2A, power-speed control curve 200 (FIG. 2A) of power-speed block 116 (FIG. 1) includes two curve portions, a maximum-power portion 200A and a speed-limit portion 200B. The goal of maximum power portion 200A is to keep wind turbine 104 operating at the peak of the power coefficient curve (in FIG. 2B, peak 210A of power coefficient curve 210). Speed limit portion 200B is used to limit power under any wind condition.

If the speed limit is chosen correctly, the power output of wind turbine 104 will be right at the power limit when the wind is high. As described in more detail below, performance-compensation block 120 adjusts the speed limit of wind turbine 104 to get exactly the power limit power of the turbine, but only when the wind is high. Since a wind speed sensor is not typically used (it is difficult to obtain useful wind speed information over the very large area swept by even a modestly sized wind turbine), it can then be assumed that the wind is high whenever the power output is over a desired threshold of the rated power, such as, for example, 80% to 90% of the rated power. As will be described below, in a detailed example this adjustment is made using an algorithm, or feedback loop, that adjusts the speed limit very slowly and only when the output power is above the desired threshold. The time constant of the feedback loop is generally quite long, for example, on the order of minutes, hours or longer. This adjustment does not need to be fast when compensating for air density variations. The slow response provides averaging over a large range of wind speeds and wind turbine speeds.

With the foregoing principles in mind, FIG. 3 illustrates an example implementation of the features of speed setting system 112 of FIG. 1 in a variable-speed fixed-pitch WPU 300. WPU 300 includes an electrical power generator 304 driven by a wind turbine, which in this example is a horizontal-axis turbine 308 having three fixed-pitch blades 308A-C. On the output side of generator 304, WPU 300 includes, in order of power flow from the generator, a rectifier 312, a direct-current (DC) bus 316 and an inverter 320. In this example, the overall operation of WPU 300 is controlled by a control system 324, or controller, which includes a speed setting system 328 that implements features of speed setting system 112 of FIG. 1. (It is noted that control system 324 is shown only as containing components relating to features of the present invention(s) for ease of description. Those skilled in the art will readily understand that control system 324 will typically include other components.) In this example, speed setting system 328 of FIG. 3 includes a power-speed block 332 and a performance-compensation block 336 that, respectively, correspond in functionality to power-speed block 116 and performance-compensation block 120 of wind-powered machine 100 of FIG. 1.

Both functional blocks 332, 336 use as inputs the current output power of wind turbine 308, which is denoted $P_r$ herein (the subscript "r" standing for "rotor," which is an alternative term often used to denote a wind turbine), and the power limit, $P_L$, of the turbine, which is the maximum power to be produced by the turbine. In this example, neither of these parameters is measured directly or otherwise available in control system 324. However, the current wind-turbine power, $P_r$, and power limit, $P_L$, can be estimated from information available in control system 324.

In this example, wind turbine power, $P_r$, can be estimated from the power input to rectifier 312 from generator 304 by using the rectifier power and compensating for generator efficiency and transmission efficiency, if any sort of transmission is present. The desired output power limit of WPU 300 is a command input into control system 324 and is thus available in the control system. Consequently, the wind-turbine power limit, $P_L$, can be obtained by using the WPU output power limit and compensating for the total drivetrain efficiency. To implement these compensations, control system 324 includes a current-power efficiency compensator 340 and a power-limit efficiency compensator 344. Current-power efficiency compensator 340 receives a signal 348 from rectifier 312 that represents the output power of generator 304, adjusts the output power to account for generator and drivetrain efficiencies, and outputs a signal 352 representing the current wind-turbine power, $P_r$. Power-limit efficiency compensator 344 receives a signal 356 representing the WPU output power limit, adjusts the output power limit to account for generator and drivetrain efficiencies, and outputs a signal 360 representing the current wind-turbine power limit, $P_L$. Signals 356, 360, and therefore, current wind-turbine power, $P_r$, and wind-turbine power limit, $P_L$, are provided to power-speed block 332 and performance-compensation block 336.

The efficiency equations utilized in current-power efficiency compensator 340 and power-limit efficiency compensator 344 are known in the art. Since these efficiency equations are a function of power output level, temperature and wind-turbine speed, if desired, they can be approximated to keep things simple. The impact of using approximations should not be significant because the efficiencies are generally quite high so that small variations will cause very small errors in the estimates of wind-turbine power, $P_r$, and wind-turbine power limit, $P_L$.

The output of speed setting system 328 is a speed command 364 that represents a speed set point for a speed controller 368, which controls the speed of wind turbine 308. In the present example, speed controller 368 receives a wind-turbine-speed signal 372 that represents the current actual speed of wind turbine 308. Signal 372 may be generated, for example, by a sensor (not shown) that measures the rotational speed of wind turbine 308. Speed controller implements simple proportional and integral control that acts on a difference between the current actual wind turbine speed and speed command to generate and send a torque command 376 to rectifier 312. Rectifier 312 simply scales torque command 376 to an electrical current in generator 304 to achieve the desired torque, thus controlling rectifier speed. In other types of drivetrains, speed controller 368 may operate in different ways; all that is generally needed is the ability to control the speed of wind turbine 308 based on a speed command.

At a high level, power-speed block 332 implements a power-speed control curve 380 (see curve 200 of FIG. 2A for a specific example in the context of a 100 kW WPU) that is the locus of points of minimum speed as between a maximum power curve 380A and a speed limit curve 380B for wind turbine 308. Power-speed block 332 uses power-speed control curve 380 to set the speed of wind turbine 308 to optimize the turbine's performance and to not let the turbine turn too fast or make too much power.

Maximum power curve 380A represents the speed at each power level that will keep wind turbine 308 on the peak of the power coefficient, Cp, curve (see, e.g., peak 210A of power coefficient curve 210 of FIG. 2B). Maximum power curve 380A can be defined by the following Equation 1:

$$\omega_r = \frac{TSR_{(pk)} \times 30}{\pi} \times \left[ \frac{2 \times P_r}{Cp_{(pk)} \times \kappa \times \pi \times r^5} \right]^{1/3} \quad \{Eq. 1\}$$

wherein:
$\omega_r$ is rotational speed of wind turbine 308 (a/k/a "rotor," hence the subscript "r");
$TSR_{(pk)}$ is tip speed ratio at the peak of the power coefficient curve;
$P_r$ is the current power output of the wind turbine (rotor);
$Cp_{(pk)}$ is the peak value of the power coefficient curve;
$\kappa$ is the performance-compensation term; and
r is the radius of the swept area of the wind turbine.

All of the parameters of Equation 1 can be known or estimated by control system 324. In the simplest case, performance-compensation term, $\kappa$, can simply be the air density if the performance of wind turbine 308 is expected to be exactly as designed. In that case, the air density can be determined from measurements of ambient air conditions. However, if the actual performance of wind turbine 308 is different from its ideal performance, performance-compensation term, $\kappa$, can be used to adjust the wind turbine speed so as to achieve the desired performance. An example of implementing a performance-adjusting performance-compensation term, $\kappa$, is described below in detail. However, before proceeding with that description, speed limit curve 380B is first described.

The present inventor has discovered that when the deep stall portion of the power coefficient curve (e.g., curve 210 of FIG. 2B) is modeled such that the power coefficient, Cp, varies as a function of the tip-speed ratio cubed, the following equation for speed limit curve 380B can be derived:

$$\omega_L = \frac{K_o \times P_L^a}{r^{5/3} \times \kappa^b} \quad \{Eq. 2\}$$

wherein:
$\omega_L$ is the rotational speed limit of wind turbine 308 (a/k/a "rotor," hence the subscript "r");
$P_L$ is power limit of the wind turbine (rotor);

$K_0$ is a constant chosen to match the Cp curve approximately;

κ is the performance-compensation term;

a is a power limit exponent;

b is a compensator exponent; and r is the radius of the wind turbine.

With the proper selection of values for exponents a and b, Equation 2 provides a desirably flat speed limit curve 380B. As with Equation 1, performance-compensation term, κ, can be the air density in the simplest case or, alternatively, can be a variable compensation term that accounts for actual differences in the performance of wind turbine 308 relative to an ideal performance. It is noted that many of these parameters need to be determined empirically based on the power coefficient curve in the stall region and that the quality of the calculated power coefficient curve may not be great in many cases. If the quality is not high enough, the power coefficient curve can be measured on an actual wind turbine. When the power coefficient curve is approximately proportional to the tip-speed-ratio cubed, both of coefficients a and b are approximately equal to ⅓. If the power coefficient curve is not approximately proportional to the tip-speed-ratio cubed, coefficients a and b may have other values.

As mentioned above, speed control curve 380 is the locus of points of minimum speed as between a maximum power curve 380A and a speed limit curve 380B for wind turbine 308. Since Equations 1 and 2, above, define, respectively, maximum power curve 380A and speed limit curve 380B, power-speed block 332 selects the minimum of these two curves to output as speed command at a given power to output as speed command 364. This is depicted in FIG. 4, which graphically illustrates the functionality of power-speed block 332. As seen in FIG. 4, inputs to power-speed block 332 are performance-compensation term, κ, current wind-turbine power, $P_r$, and wind-turbine power limit, $P_L$. Current wind-turbine power, $P_r$, and performance-compensation term, κ, are provided to a maximum power block 400, which in this example calculates and outputs a maximum power speed value 404 using Equation 1, above. Wind-turbine power limit, $P_L$, and performance-compensation term, κ, are provided to a speed limit block 408, which in this example calculates and outputs a speed limit value 412 using Equation 2, above. These two speed values 404, 412 are input to a comparing block 416, which selects and outputs the lower of the two speed values as speed command 364.

Referring again to FIG. 3, as mentioned above, performance-compensation term, κ, can be set equal to the air density in ideal circumstances, but it can also be a performance-adjusting term that accounts for any difference in performance of wind turbine 308 relative to its ideal performance. Depending on the situation, the difference may be caused by any one or more of a number of factors, including, but not limited to, changes in air density over time, blade soiling/icing, blade variations and blade-mounting variations, among others. When performance-compensation term, κ, is indeed a performance-adjusting term (it could be simply set to a constant air density value, if desired), performance-compensation block 336 implements a long-time-constant feedback loop that essentially shifts power-speed curve 380 to account for the difference between the actual and ideal performances. A long time constant is used because the factors at play manifest themselves over relatively long periods of time. For example, air density generally changes relatively slowly and blade soiling typically occurs over an extended period of time. Using a long time constant prevents short-duration phenomena, such as wind gusts, from impacting the long-term adjustments to the power output of wind turbine 308.

FIG. 5 illustrates an example implementation of performance compensation block 336 of speed setting system 328 of FIG. 3 that can be used to effectively shift power-speed curve 380 via performance-compensation term, κ. This example essentially implements integral power control feedback that changes the previous performance-compensation term, $κ_{N-1}$, only when current wind-turbine power output, $P_r$, is relatively close to wind-turbine power limit, $P_L$, for example, within 10% to 20% of the wind-turbine power limit. Otherwise, performance-compensation term, κ, is held constant. In this example, inputs to performance compensation block 336 are current wind-turbine power output, $P_r$, wind-turbine power limit, $P_L$, and the previous performance-compensation term, $κ_{N-1}$. At a difference block 500, current wind-turbine power output, $P_r$, is subtracted from wind-turbine power limit, $P_L$, to obtain a difference, ΔP. At a decision block 504, difference, ΔP, is compared to a threshold, T, which can be set to any suitable percentage of wind-turbine power limit, $P_L$, for example, a percentage in the range of 10% to 20% (which corresponds to the 80% to 90% range mentioned immediately above).

If at decision block 504 difference, ΔP, is greater than threshold, T, then the previous performance-compensation term, $κ_{N-1}$, is adjusted in block 508 by a gain factor, G, multiplied by the difference between current wind-turbine power output, $P_r$, and the power limit, $P_L$. The new value of performance-compensation term, κ, is then provided to power-speed block 332, where it is incorporated into, for example, Equations 1 and 2, above (see also FIG. 4), to effectively shift power-speed curve 380 to account for the difference in actual power output relative to the expected power output. If, however, at decision block 508 difference, ΔP, is not greater than threshold, T, performance-compensation term, κ, is not adjusted, but rather simply set to the previous performance-compensation term, $κ_{N-1}$, in block 512, because, lacking a wind speed sensor, the assumption is that the wind speed is too low.

As discussed above, the response of the algorithm implemented by performance compensation block 336 is desired to be relatively very slow, for example, on the order of minutes to hours or more. This is accomplished in this example by choosing a relatively small value for gain factor, G. As those skilled in the art will readily appreciate, the value of the gain factor, G, will depend on the particular time constant, sampling rate and power rating of the wind turbine at issues. Generally, $$G = \rho_n / (P_n * F_s * T_c) \quad \{\text{Eq. 3}\}$$

wherein:

$\rho_n$ is the standard air density in the units used in the control system;

$P_n$ is the rated power of the turbine;

$F_s$ is the sampling rate used in the integration process; and $T_c$ is the desired time constant.

In this example, the algorithm implemented in FIG. 5 requires some special features. First, it requires use of an initial value for performance-compensation term, κ, that is higher than any value expected to be needed so that it tends to run wind turbine 308 (FIG. 3) a little slow until the control stabilizes. Second, it needs to have limits that are also warnings that something may be wrong with the operation of wind turbine 308. This could be ice on blades 308A-C or many other things that would cause wind turbine 308 to be off of its performance curve by a larger amount than would generally be expected under normal operation.

It is to be noted that one or more of the aspects and embodiments described herein may be conveniently implemented using specialized circuitry, using software and using a combination of specialized circuitry and software. Regarding a partial or full implementation in software, a machine (e.g., a computing device) can be programmed and configured to communicate with other components according to the teachings of the present specification, as will be apparent to those of ordinary skill in the art. Appropriate software coding can readily be prepared by persons skilled in the art based on the teachings of the present disclosure, as will be apparent to those of appropriate ordinary skill.

Such software may be a computer program product that employs a machine-readable medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable storage medium, as used herein, is intended to include a single medium as well as the possibility of including a collection of physically separate media, such as, for example, a collection of compact disks or one or more hard disk drives in combination with a computer memory.

Figure 6:
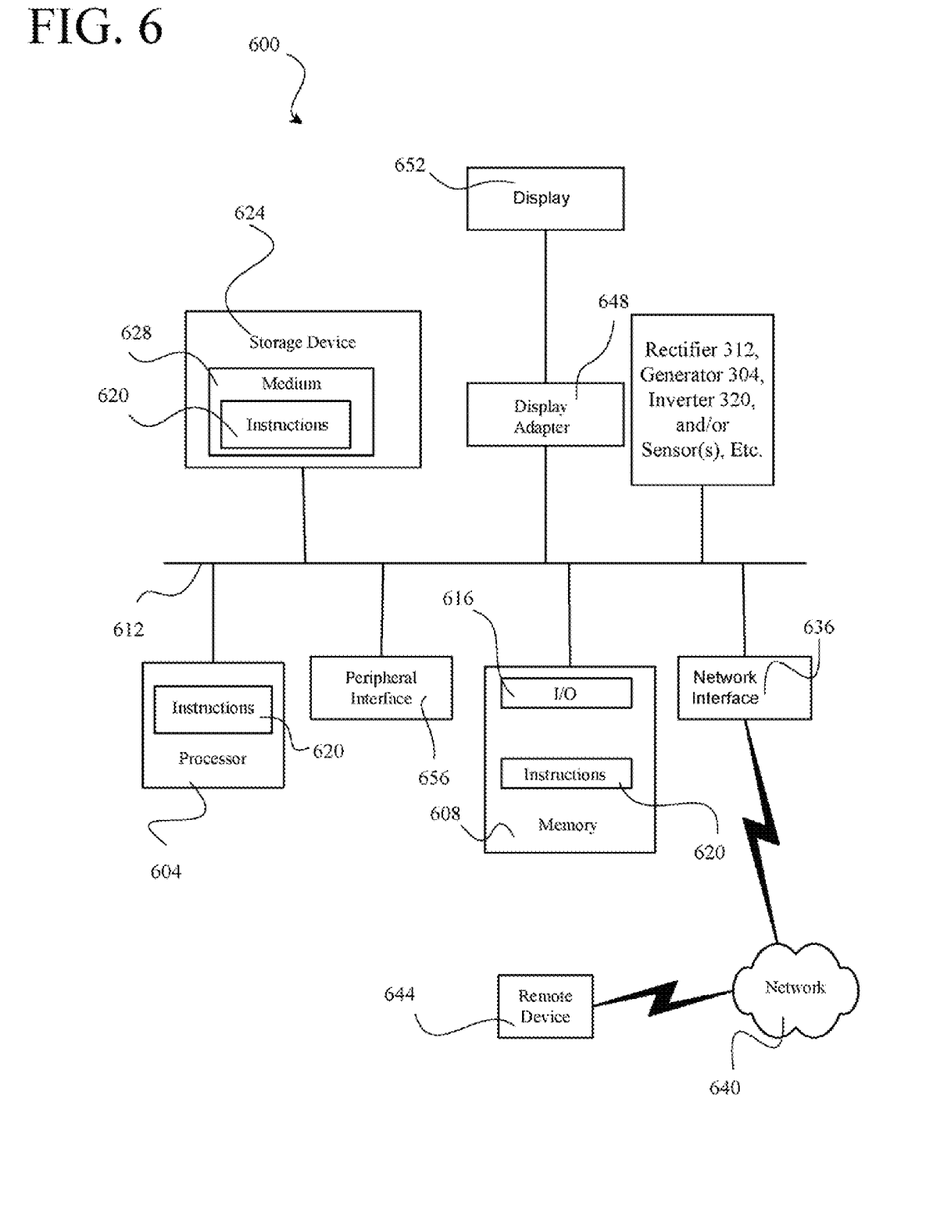
FIG. 6 is a block diagram of a computing environment that may be used to implement a wind-turbine speed setting system of the present disclosure.

Referring now to FIG. 6, and also to FIG. 3, FIG. 6 illustrates an example of a machine/computing device, or "controller" 600 (FIG. 6), that can be used to implement a set of instructions for causing control system 324 of variable-speed WPU 300 (FIG. 3) to perform any one or more of the aspects and/or methodologies of the present disclosure. Controller 600 includes a processor 604 and a memory 608 that communicate with each other, and with other components, such as rectifier 312, generator 304, and/or inverter 320, via a bus 612. Bus 612 may include any of several types of communication structures including, but not limited to, a memory bus, a memory controller, a peripheral bus, a local bus, and any combinations thereof, using any of a variety of architectures.

Memory 608 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 616 (BIOS), including basic routines that help to transfer information between elements within controller 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Controller 600 may also include a storage device 624. Examples of a storage device (e.g., storage device 624) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 624 may be removably interfaced with controller 600 (e.g., via an external port connector (not shown)). Particularly, storage device 624 and an associated machine-readable medium 628 may provide nonvolatile and/or volatile storage of machine-readable instructions, data structures, program modules, and/or other data for controller 600. In one example, instructions 620 may reside, completely or partially, within machine-readable medium 628. In another example, instructions 620 may reside, completely or partially, within processor 604.

Controller 600 may also include sensor connections to wind turbine 308 or other rotating part of WPU 300 so as to receive signals corresponding to a speed measurement. The sensor connections may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Alternatively, in one example, a user of controller 600 may enter commands and/or other information into the controller via an input device (not shown). Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof.

A user may also input commands and/or other information to controller 600 via storage device 624 (e.g., a removable disk drive, a flash drive, etc.) and/or a network interface device 636. A network interface device, such as network interface device 636 may be utilized for connecting controller 600 to one or more of a variety of networks, such as network 640, and one or more remote devices 644 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 640, may employ a wired and/or a wireless mode of communication. In general, any network topology may be used. Information (e.g., data, software 620, etc.) may be communicated to and/or from controller 600 via network interface device 636.

Controller 600 may further include a video display adapter 648 for communicating a displayable image to a display device 652. Examples of a display device include, but are not limited to, a liquid crystal display (LCD), a cathode ray tube (CRT), a plasma display, and any combinations thereof.

In addition to display device 652, controller 600 may include a connection to one or more other peripheral output devices including, but not limited to, an audio speaker, a printer, and any combinations thereof. Such other peripheral output devices may be connected to bus 612 via a peripheral interface 656. Examples of a peripheral interface include, but are not limited to, a serial port, a USB connection, a FIREWIRE connection, a parallel connection, a wireless connection, and any combinations thereof.

A digitizer (not shown) and an accompanying pen/stylus, if needed, may be included in order to digitally capture freehand input. A pen digitizer may be separately configured or coextensive with a display area of display device 652. Accordingly, a digitizer may be integrated with display device 652, or may exist as a separate device overlaying or otherwise appended to display device 652.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A controller for controlling rotational speed of a stall-controlled wind turbine of a wind-powered machine having a speed control system for controlling the rotational speed, wherein the stall-controlled wind turbine has a power-coefficient curve, the controller comprising:
   a speed setting system operatively configured to provide a speed control command to the speed control system, said speed setting system including:
      a power speed block that determines the speed control command based on a speed limit curve derived as a function of a performance-compensation term raised to the power of a compensator exponent, said compensator exponent being determined as a function of the power-coefficient curve.

2. A controller according to claim 1, wherein the stall-controlled wind turbine has a rotational speed limit, a radius and a power limit, and said speed limit curve is defined by the equation:

$$\omega_L = \frac{K_o \times P_L^a}{r^{5/3} \times \kappa^b}$$

wherein:
   $\omega_L$ is the rotational speed limit of the stall-controlled wind turbine;
   $P_L$ is the power limit of the stall-controlled wind turbine;
   $K_O$ is a constant chosen to match the power-coefficient curve approximately;
   $\kappa$ is the performance-compensation term;
   a is a power limit exponent;
   b is the compensator exponent; and
   r is the radius of the wind turbine.

3. A controller according to claim 2, wherein each of the power limit exponent a and the compensator exponent b are approximately equal to one-third.

4. A method of controlling rotational speed of a stall-controlled wind turbine of a wind-powered machine having a speed control system for controlling the rotational speed, wherein the stall-controlled wind turbine has a power-coefficient curve, the method comprising:
   receiving a power limit signal corresponding to an output power limit $P_L$ for the stall-controlled wind turbine;
   determining a speed limit command based on a speed limit curve that is a function of: 1) the output power limit $P_L$ and 2) a performance-compensation term raised to the power of a compensator exponent, said compensator exponent being determined as a function of the power-coefficient curve; and
   outputting the power speed limit command to the speed control system.

5. A method according to claim 4, further comprising defining the speed limit curve by the equation:

$$\omega_L = \frac{K_o \times P_L^a}{r^{5/3} \times \kappa^b}$$

wherein:
   $\omega_L$ is the rotational speed limit of the stall-controlled wind turbine;
   $K_O$ is a constant chosen to match the power-coefficient curve approximately;
   $\kappa$ is the performance-compensation term;
   a is a power limit exponent;
   b is the compensator exponent; and
   r is the radius of the wind turbine.

6. A method according to claim 5, wherein said defining the speed limit curve includes setting each of the power limit exponent a and the compensator exponent b equal to about one-third.

7. A machine-readable storage medium containing machine-executable instructions for implementing a method of controlling rotational speed of a stall-controlled wind turbine of a wind-powered machine having a speed control system for controlling the rotational speed, wherein the stall-controlled wind turbine has a power-coefficient curve, said machine-executable instructions comprising:
   a first set of machine-executable instructions for receiving a power limit signal corresponding to an output power limit $P_L$ for the stall-controlled wind turbine;
   a second set of machine-executable instructions for determining a speed limit command based on a speed limit curve that is a function of: 1) the output power limit $P_L$ and 2) a performance-compensation term raised to the power of a compensator exponent, said compensator exponent being determined as a function of the power-coefficient curve; and
   a third set of machine executable instructions for outputting the power speed limit command to the speed control system.

8. A machine-readable medium according to claim 7, further comprising machine-executable instructions defining the speed limit curve by the equation:

$$\omega_L = \frac{K_o \times P_L^a}{r^{5/3} \times \kappa^b}$$

wherein:
   $\omega_L$ is the rotational speed limit of the stall-controlled wind turbine;
   $K_O$ is a constant chosen to match the power-coefficient curve approximately;
   $\kappa$ is the performance-compensation term;
   a is a power limit exponent;
   b is the compensator exponent; and
   r is the radius of the wind turbine.

9. A method according to claim 8, further comprising machine-executable instructions setting each of the power limit exponent a and the compensator exponent b equal to about one-third.

* * * * *